United States Patent
Lee et al.

(10) Patent No.: US 7,247,823 B2
(45) Date of Patent: Jul. 24, 2007

(54) DEFROST VESSEL FOR MICROWAVE OVEN

(75) Inventors: Won-Hui Lee, Seoul (KR); Eung-Su Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/260,122

(22) Filed: Oct. 28, 2005

(65) Prior Publication Data

US 2006/0237452 A1    Oct. 26, 2006

(30) Foreign Application Priority Data

Apr. 20, 2005    (KR)    ........................ 10-2005-0032869

(51) Int. Cl.
   *H05B 6/80*    (2006.01)
(52) U.S. Cl. .................... 219/729; 219/725; 219/734; 219/748; 219/762; 99/DIG. 14; 426/234; 426/241
(58) Field of Classification Search ........ 219/725–730, 219/732–735, 745–748, 762; 99/DIG. 14; 426/234, 241, 243, 109
See application file for complete search history.

(56) References Cited

U.S. PATENT DOCUMENTS

| 4,499,356 A | * | 2/1985 | Hatagawa | 219/729 |
| 4,689,458 A | * | 8/1987 | Levendusky et al. | 219/729 |
| 5,416,304 A | * | 5/1995 | De La Cruz et al. | 219/730 |
| 5,582,854 A | * | 12/1996 | Nosaka et al. | 426/234 |
| 6,441,355 B2 | * | 8/2002 | Thorneywork | 219/748 |

FOREIGN PATENT DOCUMENTS

JP     56-108029    *    8/1981    .................. 219/729

\* cited by examiner

*Primary Examiner*—Philip H. Leung
(74) *Attorney, Agent, or Firm*—Birch, Stewart, Kolasch & Birch, LLP

(57) ABSTRACT

A defrost vessel for a microwave oven includes a body having a certain space therein for receiving a refrigerating load, and an antenna connected to the body for oscillating a microwave into the space of the body. When microwave is supplied into a cavity of the microwave oven, the microwave is oscillated into the space of the body by the antenna and thus the microwave is deeply penetrated up to inside of the refrigerating load. Also, the microwave is secondly emitted into the space of the body from an edge of the slot, thereby completely defrosting the refrigerating load.

16 Claims, 7 Drawing Sheets

DEFROST VESSEL FOR MICROWAVE OVEN

BACKGROUND OF THE INVENTION

1. Field of the Invention

The present invention relates to a defrost vessel for a microwave oven, and more particularly, to a defrost vessel for a microwave oven capable of completely defrosting a refrigerating load up to inside and implementing a stable defrosting function in any cavity having different sizes.

2. Description of the Related Art

A microwave oven serves to heat food by generating frictional heat between molecular structures inside food by using microwave. Since every kind of food can be cooked without a specific recipe only if a certain amount is provided, the microwave oven became a necessity for the modern people. The defrost operation using microwave enables consecutive processes, reduces a loss of food due to moisture evaporation, minimizes a quality lowering, and reduces a labor power since the defrost process is possible even in a packed state.

In the microwave oven, a cavity of a certain space for receiving food is provided in a cabinet having a box shape, and a turn-table for rotating food disposed thereon with a certain speed is installed in the cavity, and a door is openably coupled to an opening of a front side of the cavity.

A magnetron for generating microwave for heating food is installed at one side of the cavity, and a controller for controlling an automatic cooking function is installed at one side of the cavity.

In order to defrost a load of a frozen state by using the microwave oven, a defrost plate or a defrost vessel on which the load is positioned is required. The conventional defrost plate or defrost vessel will be explained in brief with reference to FIGS. 1 to 3.

A defrost plate 1 of FIG. 1 is the most well-known plate. A plurality of protrusions 2 having a certain height and a length are formed at an inner side surface of the defrost plate 1 of a plastic material with a constant interval. The defrost plate is constructed so that a drop of the load such as meat blood and water generated when the frozen load positioned on the protrusion 2 is defrosted can be contained therein.

Referring to FIG. 2, a defrost plate 10 is formed of a plastic material and has a certain thickness. As a plurality of holes 11 are radially formed, the entire weight of the defrost plate 10 is decreased and the amount of material is reduced.

Referring to FIG. 3, a cover 32 is openably coupled to an upper opening of an external container 31 of a plastic material, and an inner container 33 for containing a load is installed in the external container 31.

However, the conventional defrost plate and the defrost vessel have the following problems.

Even if the conventional defrost plate and the defrost vessel can have a proper defrost rate in a cavity of a certain size, they can not obtain an excellent defrost rate when the cavity has different sizes. The reason is because modes formed in the cavity are different according to the shape and the size of the cavity. Accordingly, a defrosting characteristic of each mode is enhanced by adjusting the shape of the cavity or by adjusting a defrosting algorithm, etc.

Since a skin depth that a microwave is radiated into the load is different according to a frozen state of the load and a melted state of the load, it is impossible to completely defrost every load. Also, as the skin depth is different, a center portion of the load is not melted by the defrost process.

BRIEF DESCRIPTION OF THE INVENTION

Therefore, an object of the present invention is to provide a defrost vessel for a microwave oven capable of obtaining a stable defrost rate in any cavity having different sizes and completely defrosting a refrigerating load.

To achieve these and other advantages and in accordance with the purpose of the present invention, as embodied and broadly described herein, there is provided a defrost vessel for a microwave oven, comprising: a body having a certain space therein for receiving a refrigerating load; and an antenna connected to the body for emitting microwave into the space of the body in a main mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF INVENTION

Reference will now be made in detail to the preferred embodiments of the present invention, examples of which are illustrated in the accompanying drawings.

The present invention is to provide a defrost vessel for a microwave oven, comprising a body having a certain space therein for receiving a refrigerating load, and an antenna connected to the body for emitting microwave into the space of the body in a main mode.

The defrost vessel for a microwave oven of the present invention will be explained in more detail with reference to the attached drawings.

Figure 1:
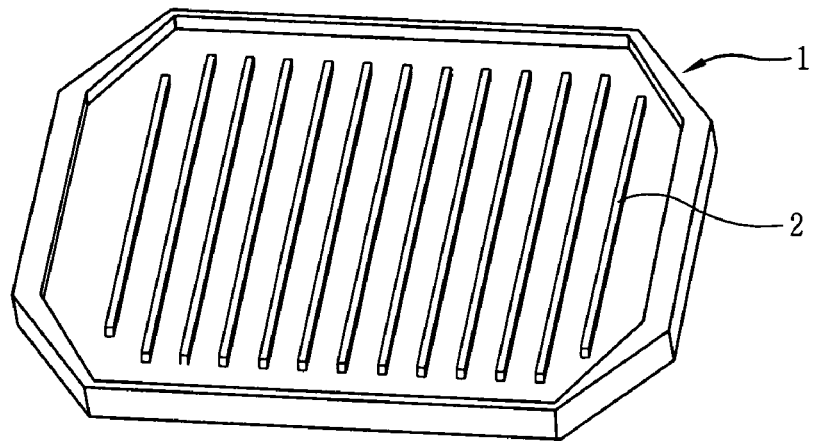
FIG. 1 is a perspective view showing an exemplary embodiment of a defrost plate for a microwave oven in accordance with the conventional art.
Figure 2:
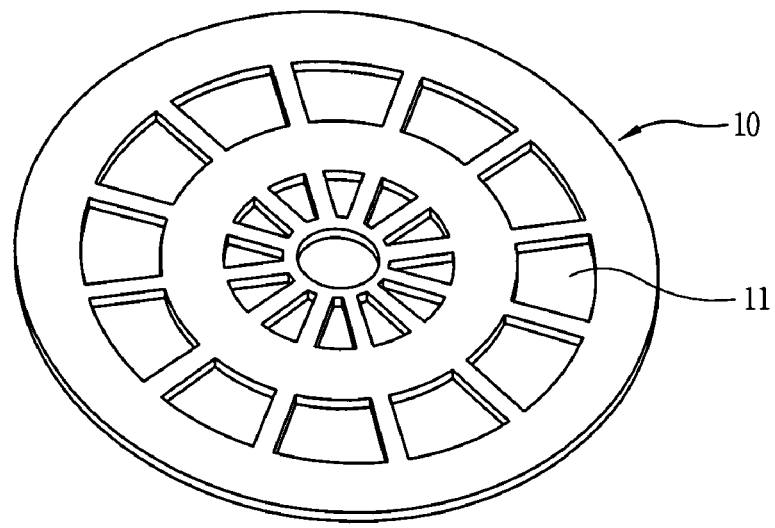
FIG. 2 is a perspective view showing another exemplary embodiment of the defrost plate for a microwave oven in accordance with the conventional art.
Figure 3:
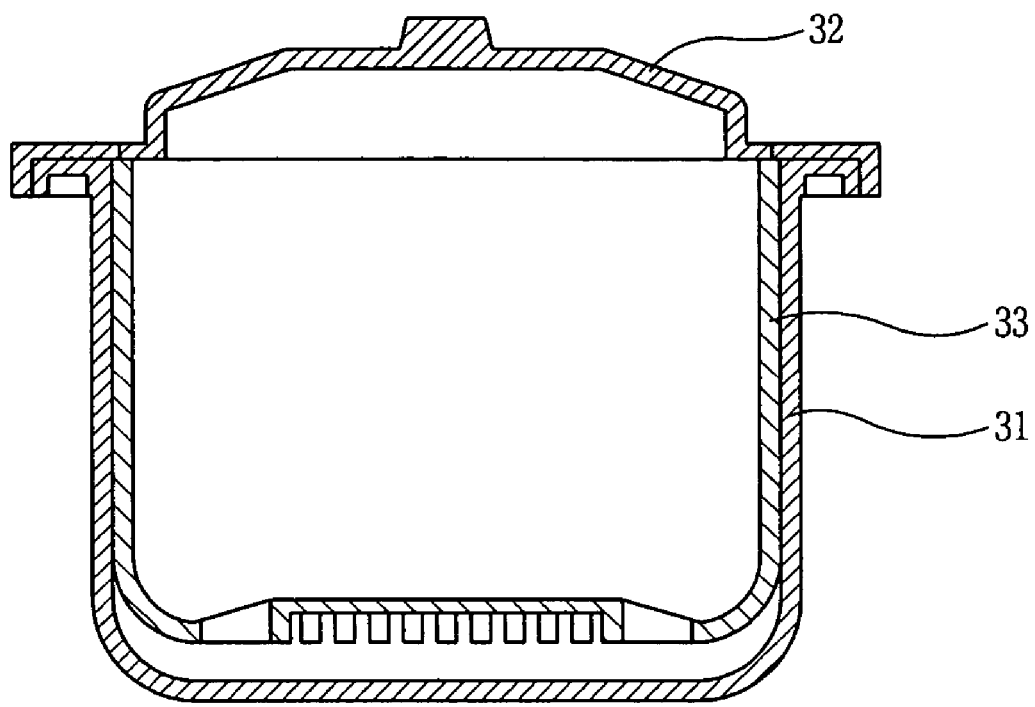
FIG. 3 is a longitudinal section view showing an exemplary embodiment of a defrost vessel for a microwave oven in accordance with the conventional art.
Figure 4:
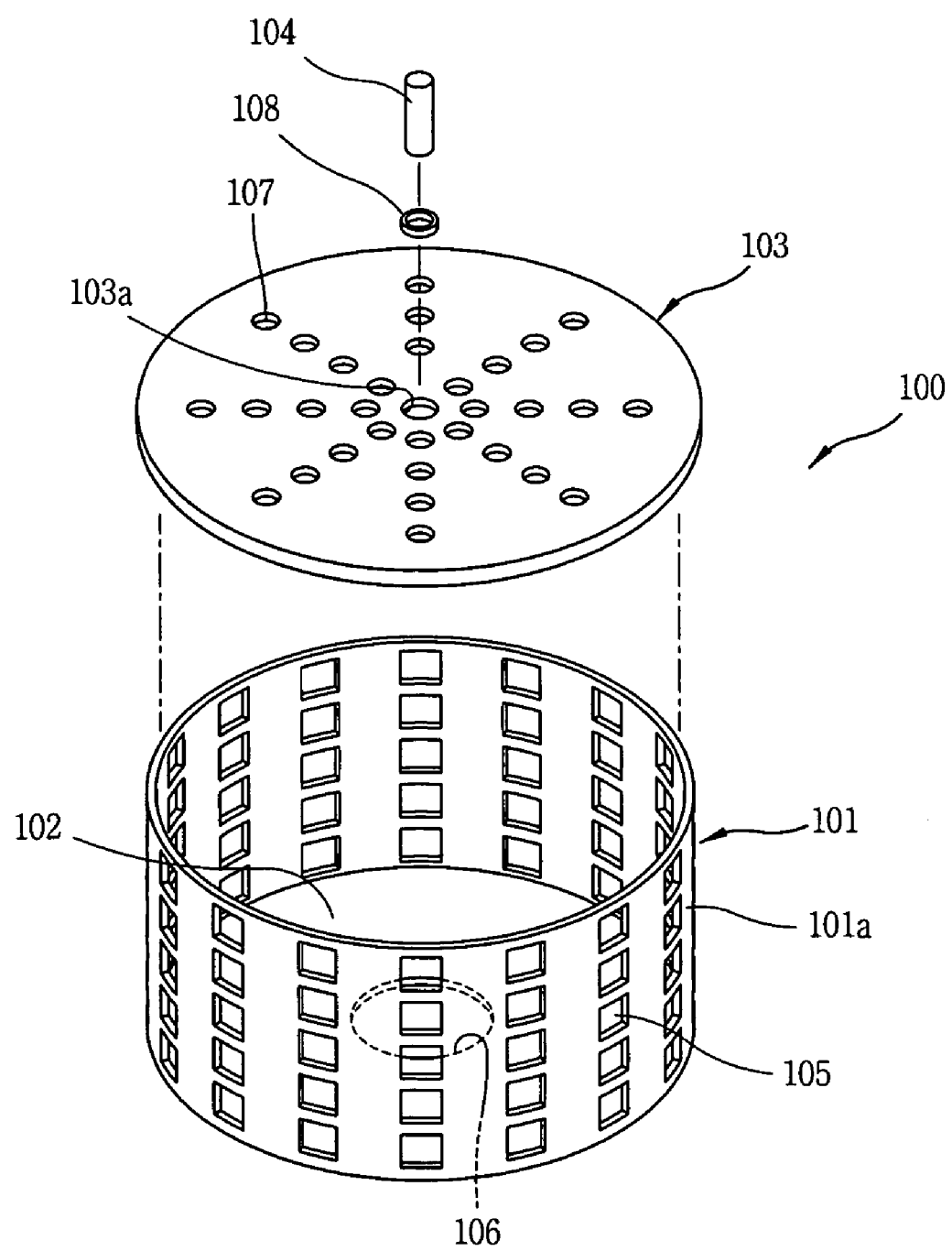
FIG. 4 is a disassembled perspective view showing a defrost vessel for a microwave oven according to the first embodiment of the present invention.
Figure 5:
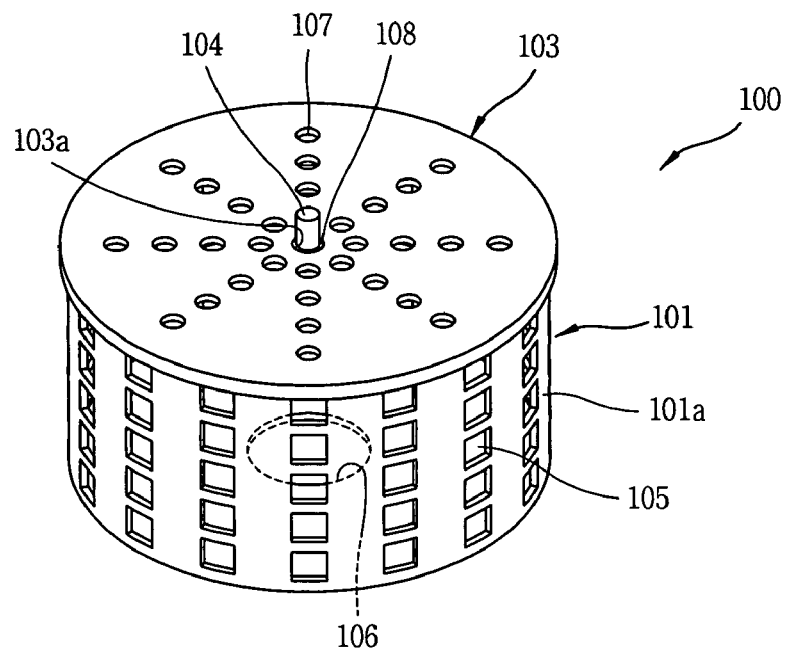
FIG. 5 is an assembled perspective view showing the defrost vessel for a microwave oven according to the first embodiment of the present invention.
Figure 6:
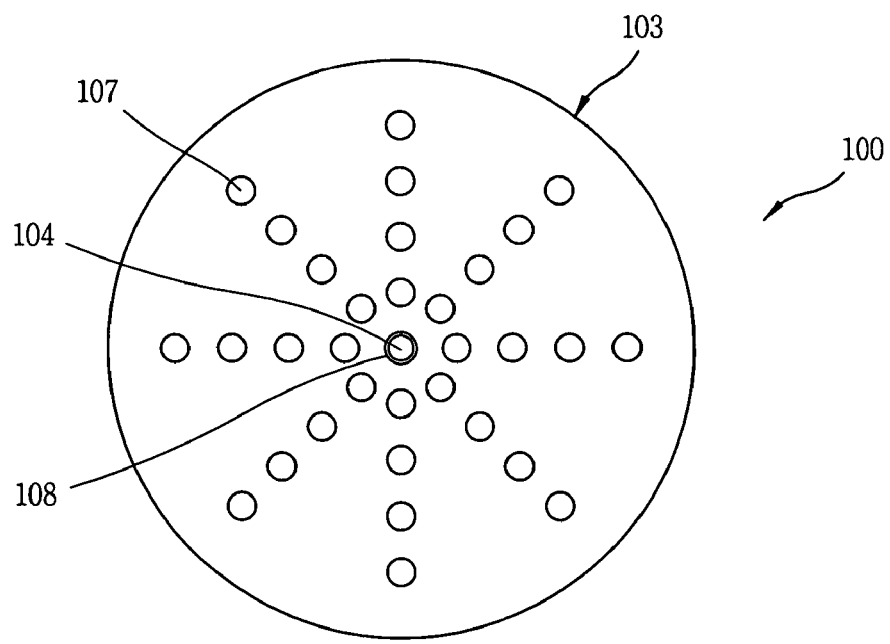
FIG. 6 is a plane view showing the defrost vessel for a microwave oven according to the first embodiment of the present invention.
Figure 7:
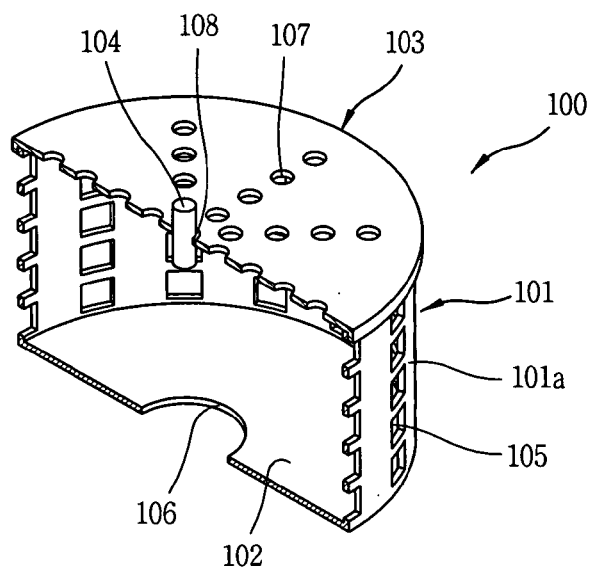
FIG. 7 is a cut-perspective view showing the defrost vessel for a microwave oven according to the first embodiment of the present invention.

FIG. 4 is a disassembled perspective view showing a defrost vessel for a microwave oven according to the first embodiment of the present invention, FIG. 5 is an assembled perspective view showing the defrost vessel for a microwave oven according to the first embodiment of the present invention, FIG. 6 is a plane view showing the defrost vessel for a microwave oven according to the first embodiment of the present invention, and FIG. 7 is a cut-perspective view showing the defrost vessel for a microwave oven according to the first embodiment of the present invention.

As shown, the defrost vessel for a microwave oven 100 comprises a body 101 having a certain space therein for receiving a refrigerating load, and an antenna 104 connected to the body 101 for emitting microwave into the space of the body 101 in a main mode.

The body 101 is preferably formed of a conductive material, but may be formed of a non-conductive material.

The shape of the body 101 is not limited to a cylindrical shape disclosed in the preferred embodiment of the present invention, but may include various shapes such as a conical shape, a semi-spherical shape, a pyramid shape, etc.

The body 101 is provided with a bottom portion 102 contacting a floor of a microwave oven, and an upper portion thereof is opened thereby to be openably closed by a cover 103.

The bottom portion 102 of the body 101 is preferably provided with an electromagnetic wave passing hole 106. The electromagnetic wave passing hole 106 passes microwave, and serves to completely defrost up to the center of a refrigerating load. The number and the shape of the electromagnetic wave passing hole 106 can be variously constructed, which will be later explained.

Preferably, the bottom portion 102 of the body 101 is provided with a forming at an inner side thereof. The forming indicates every kind of molding to form a height difference by constructing a protrusion at the inner side of the bottom portion or by constructing the bottom portion to have a circular shape and to be protruding with a certain height, etc.

Preferably, the cover 103 of the body 101 is formed of a conductive material, but may be formed of a non-conductive material, partially. The cover 103 is provided with a plurality of slots 107 for secondly emitting microwave supplied into the cavity of the microwave oven into the space of the body 101. The position, the number, and the shape of the slot 107 can be variously constructed.

A side wall 101a of the body 101 is provided with a plurality of slots 105 similarly to the slots 107 of the cover 103. The position, the number, and the shape of the slot 105 can be also variously constructed.

The antenna 104 is formed of a conductive material, and is inserted into a coupling hole 103a formed at the center of the cover 103. A non-conductive material 108 is interposed between an outer circumferential surface of the antenna 104 and the coupling hole 103a so that the antenna 104 and the cover 103 can be insulated from each other. Preferably, the antenna 104 is protruding towards inside and outside of the body 101 with a certain length. The length that the antenna 104 is protruding towards inside and outside of the body 101 is formed to enable an impedance matching so that a maximum power can be transmitted into the space of the body 101.

The antenna 104 is inserted into the cover 103 in the preferred embodiment of the present invention. However, the antenna 104 may be inserted into the side wall 101a of the body. That is, the antenna 104 may be attached to the side wall 101a only if it is insulated from the vessel by a non-conductive material and only if it is protruding towards inside and outside of the body 101 with a certain length.

At least one of the body 101, the cover 103, and the bottom portion 102 is partially formed of a non-conductive material.

Figure 8:
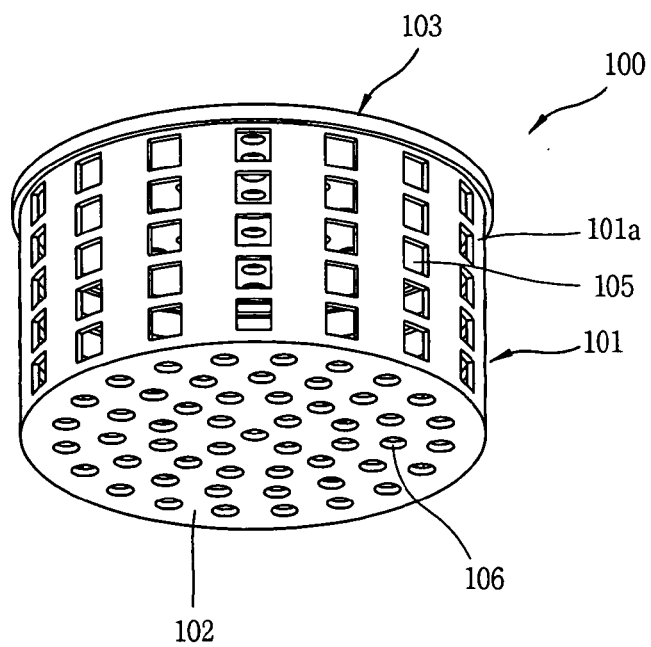
FIG. 8 is an assembled perspective view showing a defrost vessel for a microwave oven according to the second embodiment of the present invention.

FIG. 8 is an assembled perspective view showing a defrost vessel for a microwave oven according to the second embodiment of the present invention. As shown, the plurality of electromagnetic wave passing holes 106 may be arbitrarily arranged at the bottom portion 102.

Figure 10:
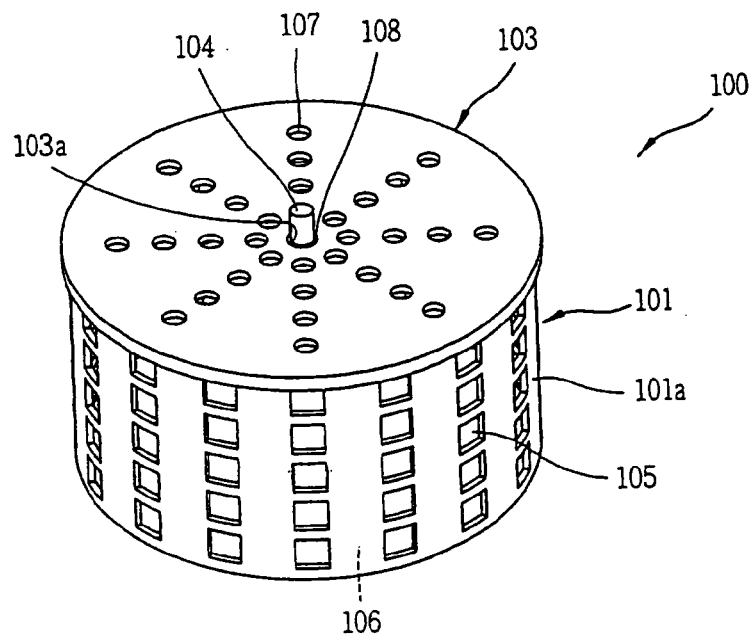
FIG. 10 is an assembled perspective view showing the defrost vessel for a microwave with an electromagnetic wave passing hole opening the entire bottom side of the body according to a variation of the second embodiment of the present invention.
Figure 11:
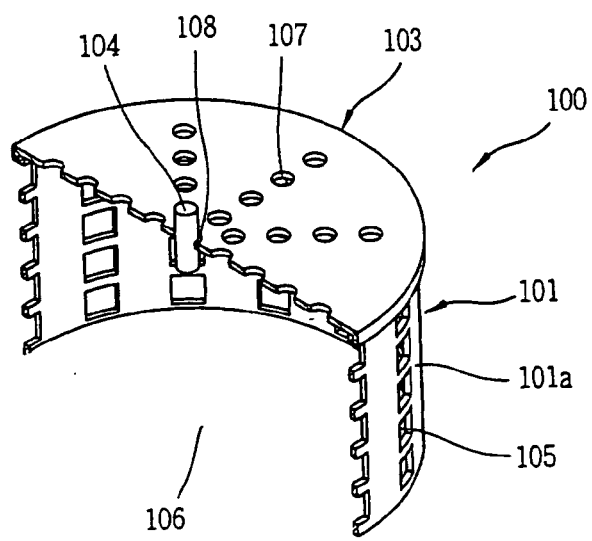
FIG. 11 is a cut-perspective view showing the defrost vessel for a microwave oven with an electromagnetic wave passing hole 106 opening the entire bottom side of the body according to a variation of the second embodiment of the present invention.

Differently from the aforementioned embodiment, the bottom portion 102 may not be provided in the second embodiment, as shown in FIGS. 10 and 11. That is, the body 101 can be directly in contact with the floor of the microwave. It is also possible that the body is in contact with a glass tray disposed on the floor of the microwave oven.

Figure 9A:
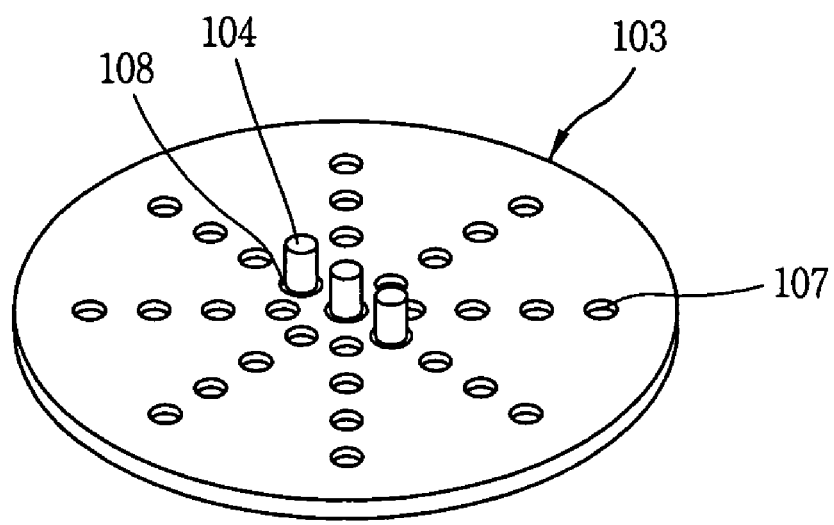
FIGS. 9A and 9B are perspective views showing a cover of a defrost vessel for a microwave oven according to the third embodiment of the present invention.
Figure 9B:
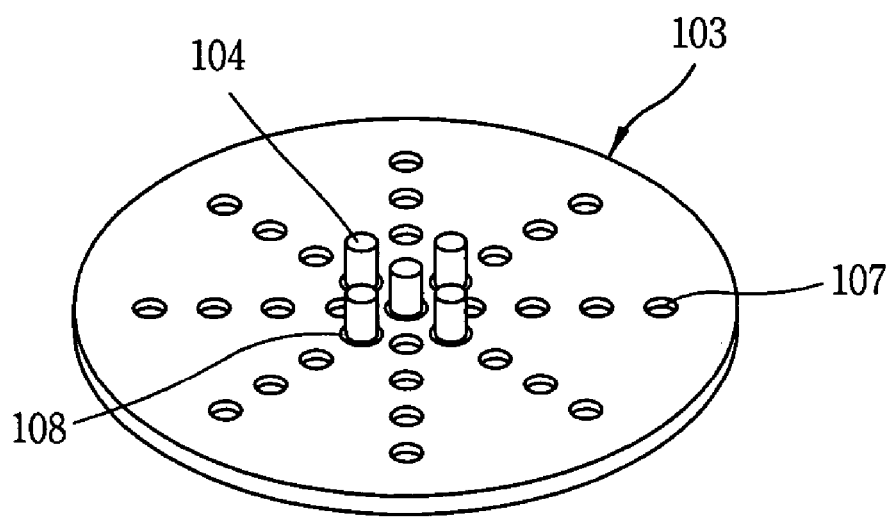

FIGS. 9A and 9B are perspective views showing a cover of a defrost vessel for a microwave oven according to the third embodiment of the present invention.

As shown in FIG. 9A, three antennas 104 may be arranged in parallel. Also, as shown in FIG. 9B, five antenna 104 may be arranged with a constant interval.

The fourth embodiment of the present invention will be explained as follows.

A door is openably formed at a side surface of the body thereby to introduce a refrigerating load.

One side of the door is provided with a hinge portion, and another side thereof is provided with a handle so that the user can open and close the door with grasping the handle. It is also possible to construct the door to be slid into the body at the time of being pushed. The door may be constructed as a cover type separated from the body.

An operation and an effect of the present invention will be explained as follows.

At the time of defrosting a frozen load by using the defrost vessel 100 of the present invention, the cover 103 is opened, then a refrigerating load is put into the space of the body 101, and then the cover 103 is closed.

Under the state, the defrost vessel 100 in which the refrigerating load is contained is put in the cavity of the microwave oven, and the microwave oven is operated. As the result, microwave is generated from the magnetron thus to be supplied into the cavity.

The microwave supplied into the cavity comes in contact with the antenna 104 thus to generate a current and to generate an electromagnetic field by the generated current. The microwave is emitted into a resonance space 102, and then is resonated in a main mode in the resonance space 102. Accordingly, the microwave is penetrated up to the inside of the refrigerating load. That is, the microwave is emitted into the resonance space 102 in a main mode by the antenna 104 thus to be penetrated into the refrigerating load, thereby enabling a complete defrost operation.

The microwave supplied into the microwave oven generates an energy field at each edge of the slots 105 of the body 101 and the cover 103. By the edge field, the microwave is secondly emitted into the resonance space 102 thereby to uniformly heat the refrigerating load.

That is, the microwave is emitted into the resonance space 102 through the antenna 104, and then is secondly emitted into the resonance space 102 through the slots 105 of the body 101 and the slots 107 of the cover 103. Accordingly, a uniform heating field is generated and thus the refrigerating load received in the resonance space 102 is completely defrosted.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A defrost vessel for a microwave oven, comprising:
   a body having a space therein for receiving a refrigerating load;
   a cover for covering an opening at a top side of the body, wherein the cover is a conductive material;
   at least one antenna extending from outside of the space through the cover into the space for emitting a microwave into the space of the body; and
   at least one electromagnetic wave passing hole at a bottom side of the body, wherein the at least one electromagnetic wave passing hole opens the entire bottom side of the body so that a refrigerating load is directly contactable with a floor of the microwave oven.

2. The defrost vessel of claim 1, wherein the body is one of a cylindrical shape, a semi-spherical shape, a pyramid shape, and a conical shape.

3. The defrost vessel of claim 1, wherein a plurality of slots are radially arranged at a top side of the cover.

4. The defrost vessel of claim 1, wherein a plurality of slots are arranged at a lateral side wall of the body.

5. The defrost vessel of claim 1, wherein a second antenna extends through a lateral side wall of the body.

6. The defrost vessel of claim 1, wherein the antenna extends through a coupling hole at a center of the cover.

7. The defrost vessel of claim 1, wherein a non-conductive material is interposed between the cover and the at least one antenna for insulation.

8. The defrost vessel of claim 1, wherein the at least one antenna includes a plurality of antennas, and the antennas extend from outside of the space through the cover into the space with a certain length.

9. The defrost vessel of claim 8, wherein the plurality of antennas are three antennas arranged in parallel.

10. The defrost vessel of claim 8, wherein the plurality of antennas are five antennas arranged with a constant interval.

11. The defrost vessel of claim 1, further comprising at least one slot at the top side of the cover and at least one slot at a lateral side wall of the body.

12. The defrost vessel of claim 11, wherein the at least one slot at the top side of the cover includes a plurality of slots radially arranged at a top side of the cover, the at least one slot at the lateral side wall of the body includes plurality of slots arranged at the lateral side wall of the body.

13. The defrost vessel of claim 12, wherein a non-conductive material is interposed between the cover and the at least one antenna for insulation.

14. The defrost vessel of claim 13, wherein at least one antenna includes a plurality of antennas extending from outside of the space through the cover into the space, one of the antennas extending through a coupling hole at a center of the cover.

15. The defrost vessel of claim 14, wherein the plurality of antennas are parallel.

16. The defrost vessel of claim 15, wherein the plurality of antennas are arranged with a constant interval.

* * * * *